United States Patent
Nilsen et al.

(10) Patent No.: US 8,054,416 B2
(45) Date of Patent: Nov. 8, 2011

(54) LIGHT POLARIZER

(75) Inventors: Robert B. Nilsen, Mystic, CT (US); Patrick W. Mullen, Barkhamsted, CT (US); Michael J. Hanrahan, Danbury, CT (US); Edward D. Phillips, Oakville, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

(21) Appl. No.: 10/728,128

(22) Filed: Dec. 4, 2003

(65) Prior Publication Data

US 2004/0169791 A1    Sep. 2, 2004

Related U.S. Application Data

(63) Continuation-in-part of application No. 09/927,781, filed on Aug. 10, 2001, now abandoned.

(60) Provisional application No. 60/225,246, filed on Aug. 15, 2000.

(51) Int. Cl.
   *G02F 1/1335* (2006.01)
(52) U.S. Cl. . 349/96; 257/98; 257/E33.06; 257/E33.068
(58) Field of Classification Search .............. 349/96; 257/98
   See application file for complete search history.

(56) References Cited

U.S. PATENT DOCUMENTS

| | | | |
|---|---|---|---|
| 2,432,484 A | 12/1947 | Moulton | |
| 3,291,871 A * | 12/1966 | Francis | 264/1.31 |
| 3,458,248 A | 7/1969 | Eversole | |
| 3,684,348 A | 8/1972 | Rowland | |
| 4,013,465 A | 3/1977 | Clapham et al. | |
| 4,260,220 A | 4/1981 | Whitehead | |
| 4,553,822 A | 11/1985 | Mahlein | |
| 4,556,292 A | 12/1985 | Mathyssek et al. | |
| 4,688,897 A | 8/1987 | Grinberg et al. | |
| 4,842,824 A * | 6/1989 | Ono | 428/64.7 |
| 5,126,882 A | 6/1992 | Oe et al. | |
| 5,133,755 A | 7/1992 | Brekke | |
| 5,157,526 A | 10/1992 | Kondo et al. | |
| 5,359,691 A | 10/1994 | Tai et al. | |
| 5,390,276 A | 2/1995 | Tai et al. | |
| 5,394,253 A | 2/1995 | Kelly | |
| 5,422,756 A | 6/1995 | Weber | |
| 5,467,208 A * | 11/1995 | Kokawa et al. | 349/67 |
| 5,559,634 A | 9/1996 | Weber | |

(Continued)

FOREIGN PATENT DOCUMENTS

EP    1 103 829 A1    5/2001

(Continued)

OTHER PUBLICATIONS

Weber, M., "Retroreflecting Sheet Polarizer," SID International Symposium, Digest of Technical Papers, ISSN 0097-966X, 427-429 (May 1992).

(Continued)

*Primary Examiner* — A. Sefer
(74) *Attorney, Agent, or Firm* — LeClairRyan

(57) ABSTRACT

A polarizer is provided comprising a subwavelength optical microstructure wherein the microstructure is partially covered with a light-transmissive inhibiting surface for polarizing light. The inhibiting surface can include a reflective surface, such as a metalized coating. The subwavelength optical microstructure can include moth-eye structures, linear prisms, or modified structures thereof. A polarizing structure is further provided comprising a plurality of moth-eye structures stacked on one another for polarizing light.

2 Claims, 12 Drawing Sheets

U.S. PATENT DOCUMENTS

| | | | |
|---|---|---|---|
| 5,572,362 A | | 11/1996 | Shikama et al. |
| 5,600,462 A | | 2/1997 | Suzuki et al. |
| 5,817,396 A | * | 10/1998 | Perlo et al. ............... 428/141 |
| 5,856,855 A | | 1/1999 | Mol et al. |
| 5,917,570 A | | 6/1999 | Bryan-Brown et al. |
| 5,940,149 A | | 8/1999 | Vanderwerf |
| 5,943,167 A | | 8/1999 | Kelly |
| 5,948,831 A | | 9/1999 | Broer et al. |
| 5,968,666 A | | 10/1999 | Carter et al. |
| 5,991,077 A | | 11/1999 | Carlson et al. |
| 6,004,713 A | | 12/1999 | Urata et al. |
| 6,027,220 A | | 2/2000 | Arai |
| 6,031,665 A | | 2/2000 | Carlson et al. |
| 6,072,628 A | | 6/2000 | Sarayeddine |
| 6,081,376 A | | 6/2000 | Hansen et al. |
| 6,084,714 A | | 7/2000 | Ushiyama et al. |
| 6,124,971 A | | 9/2000 | Ouderkirk et al. |
| 6,156,397 A | | 12/2000 | Stephenson |
| 6,175,442 B1 | * | 1/2001 | Booth et al. ............... 359/290 |
| 6,262,842 B1 | | 7/2001 | Ouderkirk et al. |
| 6,322,236 B1 | | 11/2001 | Campbell et al. |
| 6,348,995 B1 | | 2/2002 | Hansen et al. |
| 6,356,389 B1 | * | 3/2002 | Nilsen et al. ............... 359/625 |
| 6,384,884 B1 | | 5/2002 | Nakamura et al. |
| 6,447,120 B1 | | 9/2002 | Hansen et al. |
| 2001/0053023 A1 | | 12/2001 | Kameno et al. |
| 2002/0015135 A1 | | 2/2002 | Hansen et al. |
| 2002/0032488 A1 | | 3/2002 | Brekke et al. |
| 2002/0105710 A1 | | 8/2002 | Lee et al. |
| 2002/0122235 A1 | | 9/2002 | Kurtz et al. |
| 2002/0135869 A1 | * | 9/2002 | Banish et al. ............... 359/350 |
| 2002/0191286 A1 | * | 12/2002 | Gale et al. ............... 359/486 |
| 2004/0006146 A1 | | 1/2004 | Evans et al. |
| 2005/0185279 A1 | * | 8/2005 | Mullen et al. ............... 359/530 |
| 2007/0253072 A1 | * | 11/2007 | Mullen et al. ............... 359/641 |
| 2008/0088923 A1 | * | 4/2008 | Nilsen et al. ............... 359/486 |

FOREIGN PATENT DOCUMENTS

| | | | |
|---|---|---|---|
| JP | 10-073722 | | 3/1998 |
| JP | 11-337728 | * | 12/1999 |
| JP | 2000-221324 | * | 8/2000 |
| JP | 2003302532 A | | 10/2003 |
| WO | WO 95/14249 | | 5/1995 |
| WO | WO 00/08496 | | 2/2000 |
| WO | WO 00/17677 | | 3/2000 |
| WO | WO 00/17698 | | 3/2000 |
| WO | WO 00/22463 | | 4/2000 |
| WO | WO 00/33122 | | 6/2000 |
| WO | WO 00/57214 | | 9/2000 |
| WO | WO 00/65385 | | 11/2000 |
| WO | 02/14909 A2 | | 2/2002 |

OTHER PUBLICATIONS

ACEPT W³Group, Polarized Light, Polarized Light Reading, Department of Physics and Astronomy, Arizona State University, Tempe, Arizona [online], Dec. 1999 [retrieved on Jul. 12, 2001]. Retrieved from the Internet <URL:http://acept.la.asu.edu/PiN/rdg/polarize/polarize.shtml>.

Boerner, V., et al., "Holographic Surface-Relief Microstructures for Large Area Applications," 1st euspen Topical Conference on Fabrication and Metrology in Nanotechnology and 2nd General Meeting of the European Society for Precision Engineering and Nanotechnology, Copenhagen, Denmark, May 28-30, 2000.

Module 6-10, "Polarizers," The Center for Occupational Research and Development, Waco, Texas[online], 1988 [retrieved on Jul. 12, 2001]. Retrieved from the Internet <URL:http://cord.org/cm/leot/course06_mod10/mod06_10.htm>.

Yu, Z., et al., "Reflective Polarizer Based on a Stacked Double-Layer Subwavelength Metal Grating Structure Fabricated Using Nanoimprint Lithography," *Applied Physics Letters*, American Institute of Physics, New York, New York, vol. 77, No. 7, pp. 927-929, Aug. 14, 2000.

Wilson, S. J., et al., "The Optical Properties of 'Moth Eye' Antireflection Surfaces," *Optica Acta*, XX, XX, vol. 29, No. 7, pp. 993-1009, 1982.

Chou, S. Y., et al., "Subwavelength Amorphous Silicon Transmission Gratings and Applications in Polarizers and Waveplates," *Applied Physics Letters*, American Institute of Physics, vol. 67, No. 6, pp. 742-744, Aug. 7, 1995.

Jagt, H. J. B., et al., "Micro-structured Polymeric Linearly Polarized Light Emitting Lightguide for LCD Illumination," *SID 02 Digest*, 45.3:1236-1239 (2002).

Chien, K.-W., et al., "An Integrated Lightguide Equipped with Polarization Conversion," *SID 02 Digest*, 45.1:1229-1231 (12002).

Broer et al., "New Functional Polymers for Liquid Crystal Displays Review of Some Recent Developments," Philips Research Laboratories, The Netherlands, Eindhoven University of Technology, The Netherlands.

Guo et al., "Fabrication of Thin-film Micropolarizer Arrays for Visible Imaging Polarimetry," Applied Optics 39 (10):1486-92 (2000).

Lyons, "The Light Fantastic," talk presented in Mar. 1987, printed Aug. 9, 2004 at http://www.austine.com/lyons.shtml.

"Optical surfaces Based on Arrays of Microscopic Pillars," NASA's Jet Propulsion Laboratory, pp. 1-2, Pasadena California, printed Oct. 13, 2004 from http://www.nasatech.com/Briefs/Jan01/NPO20565.html.

Oriel Instruments, "Polarizing Optics Technical Discussion," pp. 1-4.

International Search Report for International Patent Application No. PCT/US2004/040451 (Dec. 3, 2004).

* cited by examiner

LIGHT POLARIZER

RELATED APPLICATION

This application is a Continuation-in-Part Application of U.S. application Ser. No. 09/927,781, filed on Aug. 10, 2001 now abandoned, which claims the benefit of U.S. Provisional Application No. 60/225,246, filed on Aug. 15, 2000. The entire teachings of the above applications are incorporated herein by reference.

BACKGROUND OF THE INVENTION

Sunlight is typically regarded as unpolarized light. In order to reduce the glare on reflected light, glass lenses have incorporated polarizing elements. The light is typically polarized by introducing a polarization film to each lens element to produce polarized light wherein the impinging light is divided into reflected, absorbed and transmitted polarized light beams by the polarizing lens elements. Coatings have also been applied to lens elements in order to produce a mirrored appearance for the lenses and to decrease transmission of visible light in order to reduce the associated glare.

SUMMARY OF THE INVENTION

A polarizer is provided comprising a subwavelength optical microstructure wherein the microstructure is partially covered with a light-transmissive inhibiting surface for polarizing light. The inhibiting surface can include a reflective surface, such as a metalized coating. The subwavelength optical microstructure can include moth-eye structures, linear prisms, or modified structures thereof. A polarizer is also provided comprising a plurality of moth-eye structures stacked on one another for polarizing light.

A liquid crystal display is also provided comprising a first polarizer including at least one subwavelength optical microstructure having at least part of a surface covered with a metalized coating for polarizing light and for carrying an electric current. The display includes a second polarizer adjacent to the first polarizer, which is 90 degrees offset relative to the first polarizer, and a plurality of liquid crystals disposed between the polarizers.

A filter is provided which includes at least one subwavelength optical microstructure having at least part of a surface covered with a light-transmissive inhibiting surface for polarizing light and a resonance structure adjacent to the microstructure for reflecting light that has passed through the microstructure having a predetermined wavelength.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
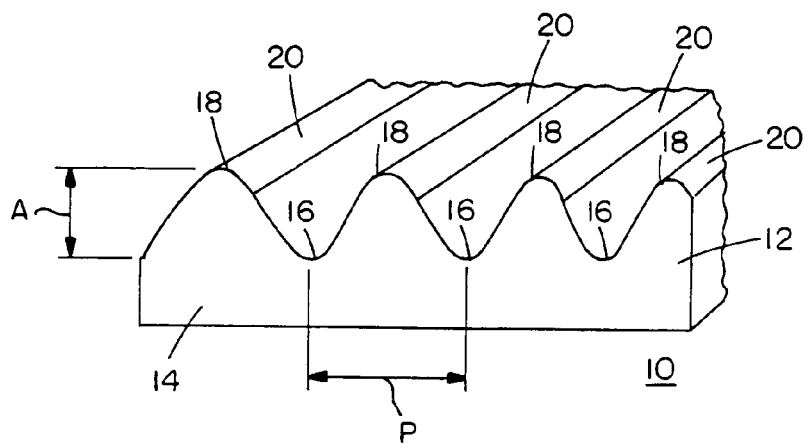
FIG. 1 is partial isometric view of a polarizing film utilizing moth-eye structures in accordance with the present invention.

A description of various embodiments of the invention follows. FIG. 1 illustrates an embodiment of a polarizing film, generally designated as reference numeral 10. A subwavelength optical microstructure, such as a linear moth-eye structure 12, is formed on a substrate 14. Moth-eye structures are explained in more detail in U.S. application Ser. No. 09/438,912, now issued as U.S. Pat. No. 6,356,389 on Mar. 12, 2002, filed Nov. 12, 1999, now issued the teachings of which are incorporated herein in their entirety. In one embodiment, the moth-eye structure 12 is formed from the same material as the substrate 14. The moth-eye structure can be formed, for example, through embossing, molding, or casting. In another embodiment, the moth-eye structure 12 is formed from a material having a different index of refraction than the substrate 14. The substrate 14 can include light-transmissive materials such as plastics. In one manufacturing technique, the substrate 14 is relatively soft such that the moth-eye tool penetrates the substrate so excess resin layer is not present.

Figure 2:
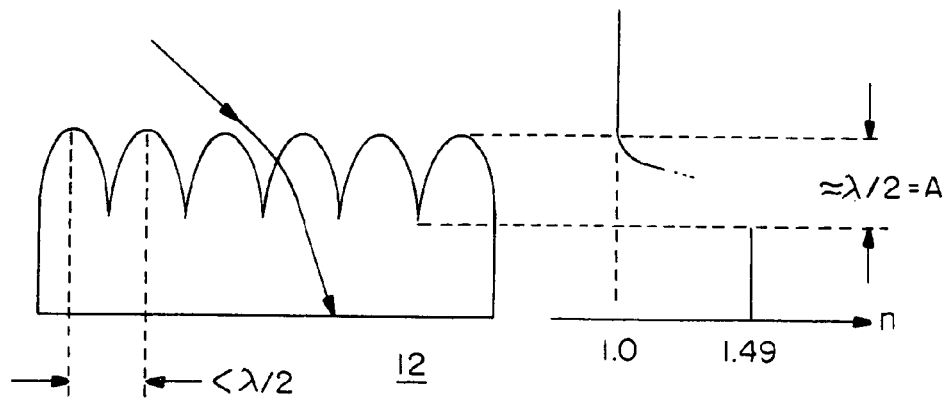
FIG. 2 is a side view of a subwavelength optical microstructure.

As shown in FIG. 2, the moth-eye structure 12 applied in one embodiment has an amplitude (A) of about 0.4 micrometers and a period (P) of less than about 0.2 micrometers. The structure is sinusoidal in appearance and can provide a deep green to deep blue color when viewed at grazing angles of incidence. If the period (P) is made to be about 180 nm or less, this color will not be present. In one embodiment, the amplitude is about three times the period to provide a three to one aspect ratio.

The moth-eye structure 12 provides anti-reflection properties to the previously smooth light entrance surface of the substrate even at entrance angles that are near grazing incidence. The moth-eye structure is more effective than standard thin film anti-reflection coatings at wide angles of incidence especially angles of incidence beyond 30 degrees up to 80 degrees. This characteristic can cause many types of optical microstructure films including linear prism films to process light very differently than the standard linear prism collimating films which have smooth entrance surfaces with or without standard anti-reflection thin film (vacuum deposited or liquid applied) coatings. The addition of the moth-eye structures helps to more efficiently recycle light and also redirects the normally reflected grazing angle incidence rays into the optical microstructure (such as linear prisms) sheet where the rays are refracted, reflected or retroreflected depending on the respective angles of incidence. This moth-eye improvement concept can be added to many types of brightness enhancement films (BEF). An advantage is that functional optical microstructures can be applied to both sides of a film or substrate.

A moth-eye anti-reflection surface is one in which the reflection of light is reduced by the presence of a regular array of small protuberances covering the surface. The spacing of the protuberances is less than the wavelength of light for which anti-reflection is sought. A moth-eye surface can be understood in terms of a surface layer in which the refractive index varies gradually from unity to that of the bulk material. Without such a layer, the Fresnel reflection coefficient at an interface of two media is equal to $((n_1-n_2)/(n_1+n_2))^2$, where $n_1$ and $n_2$ are the refractive indices of the media. However, if there is a gradual change of index, net reflectance can be regarded as the result of an infinite series of reflections at each incremental change in index. Since each reflection comes from a different depth from the surface, each has a different phase. If a transition takes place over an optical distance of $\lambda/2$, all phases are present, there is destructive interference and the reflectance falls to zero.

When the height of the protuberance (h) is significantly less than the wavelength ($\lambda$), the interface appears relatively sharp and the reflectance is essentially that of a discontinuous boundary. As the ratio of $h/\lambda$ increases, the reflectance decreases to a minimum value at about $h/\lambda=0.4$. Further increases in $h/\lambda$ show a series of successive maxima and minima, but the value does not again approach that of a sharp interface. The details of the curve shown in FIG. 2 vary depending on the profile of the change of the index of refraction, but if the thickness is of the order of half a wavelength or more the reflectance is considerably reduced. The spacing of the protuberances should be sufficiently fine to avoid losses by diffraction. Preferably, it should be less than the shortest wavelength involved divided by the refractive index of the material.

It is important that the spacing P between the peaks of the protuberances on the moth-eye surface is sufficiently small that the array cannot be resolved by incident light. If this is not the case, the array can act as a diffraction grating and, although there may well be a reduction in the specular reflection (zero order), the light is simply redistributed into the diffracted orders. In other words, P is less than $\lambda$ for normal incidence and d is less than $\lambda/2$ for oblique incidence if for reflection only, and that d is less than $\lambda/2n$ in the case of transmission where diffraction inside the material is suppressed.

For a given moth-eye surface, where the height of the protuberances is h and the spacing is d, the reflectance is expected to be very low for wavelengths less than about 2.5 h and greater than d at normal incidence, and for wavelengths greater than 2d for oblique incidence. In one embodiment, the spacing is as close as possible, and the depth as great as possible, in order to give the widest possible bandwidth. For example, a h/d ratio can be about three.

The moth-eye effect should not be confused with that of reducing the specular reflectance by roughening. Roughness merely redistributes the reflected light as diffuse scattering and degrades the transmitted wavefront. With the moth-eye structure, there is no increase in diffuse scattering, the transmitted wavefront is not degraded and the reduction in reflection gives rise to a corresponding increase in transmission.

The moth-eye structure 12 has many advantages. There is no extra coating process necessary. The structure can be transferred to the sheet by a pressure molding process, such as with a Fresnel structure. The reflection reduction does not depend on the wavelength. There is only a lower limit (on the ultraviolet side of the spectrum) set by the structure period. If the wavelength is too small compared to the period, the light is diffracted. In regard to angular dependence, with conventional anti-reflective coatings, the transmission curve shifts with the light incidence angle. With the moth-eye structure, the critical wavelength for diffraction shifts to higher values, but there are no changes above this wavelength. Another advantage for moth-eye structures is that there can be no adhesion problems between lens and gradient layer because it can be one bulk material. From a high incident angle, the surfaces can appear blue or violet.

In one embodiment of forming a moth-eye structure, the structure is first produced on a photoresist-covered glass substrate by a holographic exposure using an ultraviolet laser. A suitable device is available from Holographic Lithography Systems of Bedford, Mass. 01730. An example of a method is disclosed in U.S. Pat. No. 4,013,465, issued to Clapham et al. on Mar. 22, 1977, the teachings of which are incorporated herein by reference. This method is sensitive to changes in the environment, such as temperature and dust, and care must taken. The structure is then transferred to a nickel shim by an electroforming process. In one embodiment, the shims are about 300 micrometers thick or less.

The moth-eye structures can be made one dimensional in a grating type pattern. In this embodiment, the structure has a nearly rectangular profile, which means they have no gradient layers, but more of a one layer anti-reflective coating with a lowered refractive index in the structure region. Control of the grating depth is important as is control of thickness for the evaporated layers. Control of depth and thickness is achieved by maintaining uniformity of beam exposure, substrate flatness and exposure time.

A two-dimensional structure is formed by two exposures with a linear sinus-grid, turned by 90 degrees for the second exposure. A third type of structure is formed by three exposures with turns of 60 degrees to provide a hexagonal or honeycomb shape.

In one embodiment, the material which forms the moth-eye structure 12 is substantially transparent as formed. Exemplary materials include a thermoplastic or thermoset, such as polymethalmythacrylate, polyurethane, or polycarbonate. In one embodiment, ultraviolet cured thermoset materials which have a low viscosity prior to curing provide the preferred replication fidelity. The moth-eye structure 12 can include valleys 16 and peaks 18. The pitch P, or distance between valleys 16, in one embodiment, is less than or equal to about 250 nm. The amplitude A, or vertical distance from peak 18 to valley 16, in one embodiment, is greater than or equal to about 250 nm for visible wavelength light.

In one embodiment, at least part of the surface of the moth-eye structure 12 includes a light-transmissive inhibiting surface, such as a reflective or diffuse surface 20. As shown, the surfaces 20 are spaced apart and substantially parallel. In one embodiment, the reflective surface 20 is formed from a metalized coating, such as aluminum or the like. The diffuse surface, in one embodiment, includes an engineered surface relief diffuser such that light incident upon the surface is redirected in transmission and by reflection. An example of suitable diffusers is disclosed in U.S. Pat. No. 5,600,462, issued to Suzuki, et al. on Feb. 4, 1997, the teachings of which are incorporated herein by reference. Another example of a suitable relief diffuser is disclosed in an article entitled "Holographic surface-relief microstructures for large area applications" by V. Boerner, et al. of Fraunhofer Institute for Solar Energy Systems ISE, Oltmansstr. 5, 79100 Freiburg, Germany, which was presented in a conference held in Copenhagen, Denmark from May 28-30, 2000, the teachings of which are incorporated herein by reference.

It is known that closely spaced parallel electrical conductors can be used to polarize electromagnetic waves. The conductors reflect and absorb waves that are polarized in a plane that is parallel to the length of the conductors. A wave that is polarized in a plane perpendicular to the length of the conductors passes through the conductors with little transmission loss.

Figure 3:
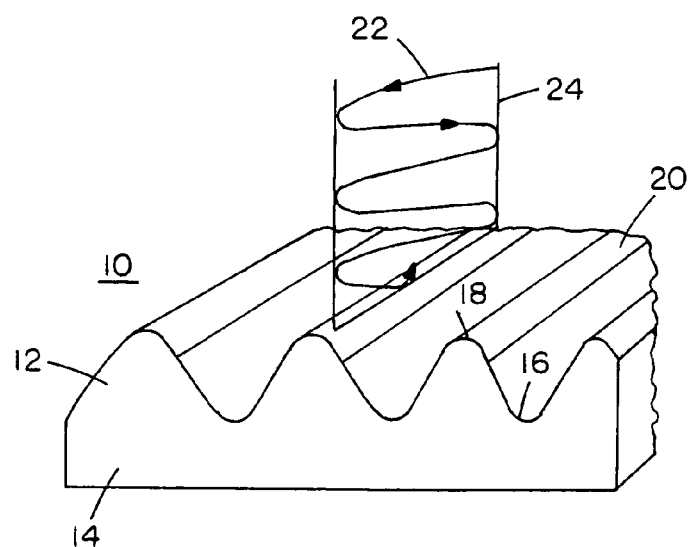
FIG. 3 is a partial isometric view of a polarizing film utilizing moth-eye structures in accordance with the present invention.
Figure 4:
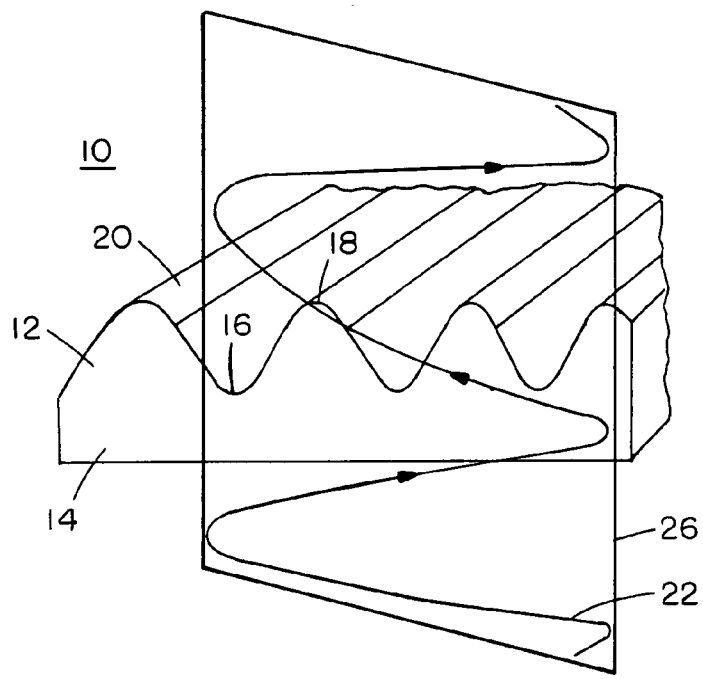
FIG. 4 is a partial isometric view of a polarizing film utilizing moth-eye structures in accordance with the present invention.

As shown in FIG. 3, the polarizing film 10 reflects and absorbs light rays, such as light ray 22, which travel in a plane 24 parallel to the film. More particularly, plane 24 is parallel to valleys 16, peaks 18, and surfaces 20. As shown in FIG. 4, if light ray 22 were traveling in a non-parallel plane, for example, plane 26, the light ray would pass through the film 10 with little transmission loss. In this manner, only light rays which are substantially perpendicular to the valleys 16, peaks 18, and surfaces 20 are allowed to pass through the film 10. The amount of light reflected or diffused is dependent upon the reflection and transmission properties of surface 20. Thus, a simple and relatively inexpensive polarizing film has been discovered.

Figure 5:
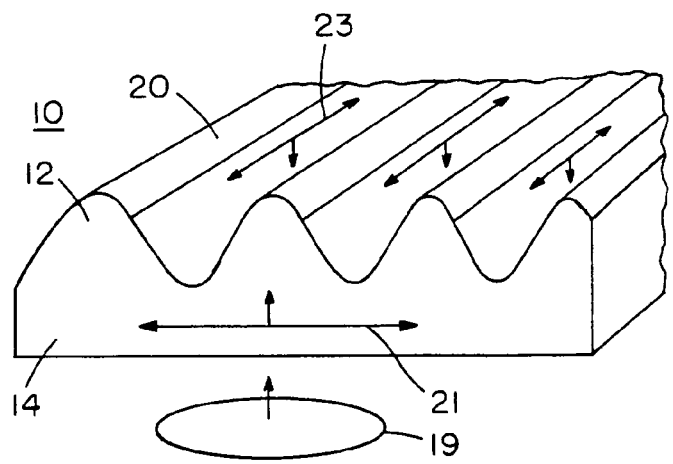
FIG. 5 is a partial isometric view of a polarizing film utilizing moth-eye structures in accordance with the present invention.

FIG. 5 illustrates the same concept of FIGS. 3 and 4. An incoming randomly polarized light wave 19 is polarized. More particularly, the film 10 reflects the component 23 of the light wave 19 which lies in plane parallel to the surfaces 20 and allows transmission of the component 21 of the light wave perpendicular to the surfaces 20.

Figure 6:
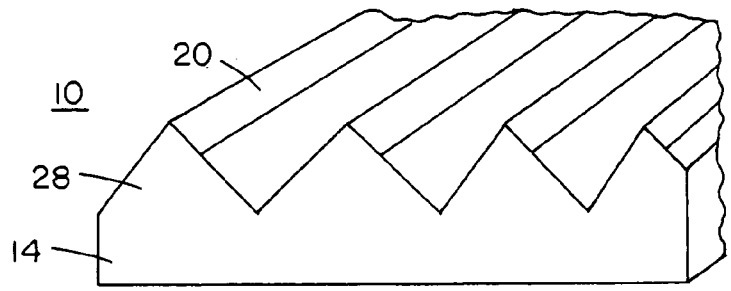
FIG. 6 is a partial isometric view of a polarizing film utilizing linear prisms in accordance with the present invention.
Figure 7:
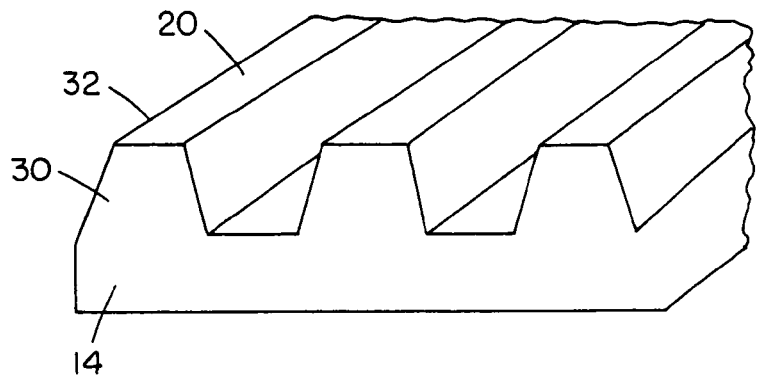
FIG. 7 is a partial isometric view of a polarizing film utilizing modified moth-eye structures in accordance with the present invention.
Figure 20:
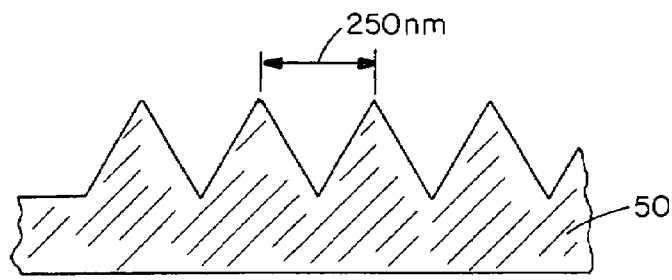
FIG. 20 is a side view of a tool used to form linear prisms for use in polarizing films in accordance with the present invention.

FIG. 6 illustrates another embodiment of the polarizing film 10 which includes linear prisms 28 formed on substrate 14. In one embodiment, the linear prisms 28 are isosceles triangles with the height greater than the base with the pitch as described before. As illustrated in FIG. 7, yet another embodiment of a polarizing film 10 is illustrated. A moth-eye type structure 30 having a flat top 32 having surface 20 thereon. In this embodiment, the light which is reflected back can reflect back in a direction consistent with the angle of incidence equaling the angle of reflection from flat top 32. If surface 20 is metalized and combined with a surface relief diffuser or structured surface as shown in FIG. 20, the surface serves as a type of anti-glare surface. Directional light, such as from an overhead light fixture, is reflected at a defined angle(s) away from the surface. Light passing through the polarizer is viewed without interference from the reflected light. Applications range from a window film to a computer monitor film. Other shapes of the polarizing film, or combinations of the disclosed shapes of the structures, are contemplated herein. Further, the substrate 14 can be formed from the same material as the structure having surface 20.

Figure 8:
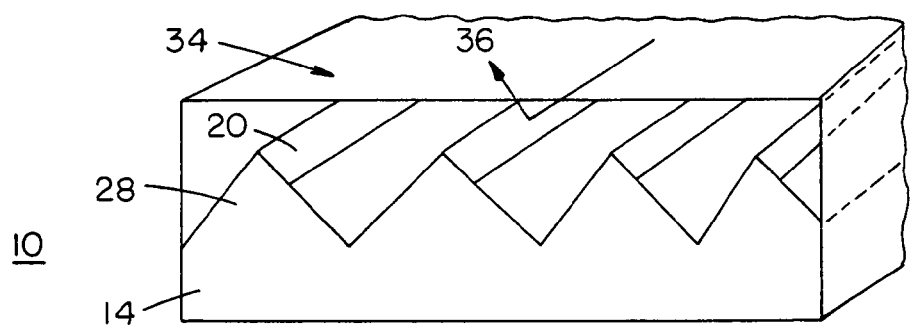
FIG. 8 is a partial isometric view of a polarizing film utilizing linear prisms having a transparent coating thereon in accordance with the present invention.

FIG. 8 illustrates a transparent coating 34 formed over linear prisms 28 to protect the surface 20. Transparent coating 34 can be formed over any of the disclosed embodiments. The shape of this structure reflects ambient light 36 away in a controlled direction and is one form of construction that can be used as an anti-glare light redirection film as well as a polarizing film. This structure can also be used to create an anti-counterfeit document feature because when superimposed upon a document with an optically clear adhesive, the document is easily viewed in specific directions. However, when the document is photocopied, the copy is darker as a result of much of the light being reflected. Other indicia, such as logos and water marks, can be added into the film, for example, by removing a portion of the moth-eye structure or pattern metalizing. In one embodiment, laser etching is used to remove the structure in the moth-eye tooling without effecting the transmission of the film 10.

Figure 9:
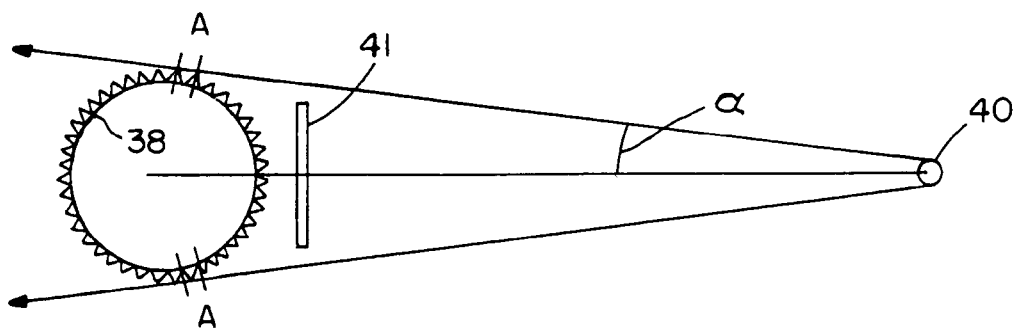
FIG. 9 is a side view of an apparatus for metalizing polarizing film in accordance with the present invention.
Figure 10:
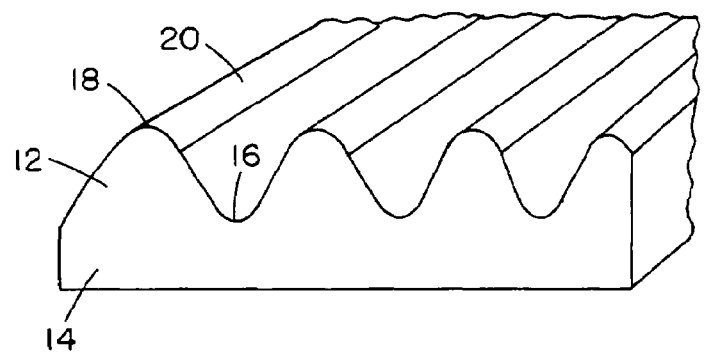
FIG. 10 is a partial isometric view of a polarizing film utilizing moth-eye structures which have both sides of the peaks metalized in accordance with the present invention.
Figure 11:
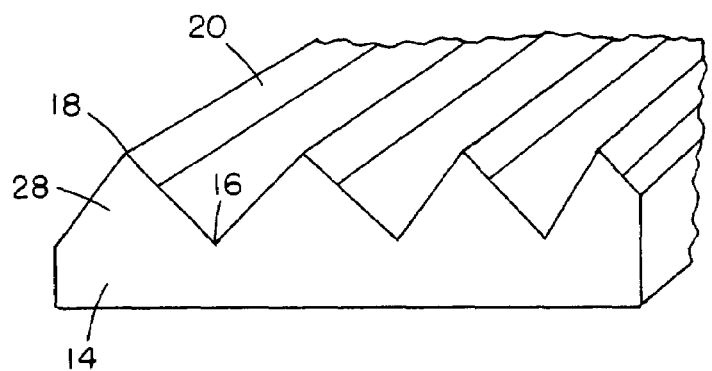
FIG. 11 is a partial isometric view of a polarizing film utilizing linear prisms which have both sides of the peaks metalized in accordance with the present invention.

FIG. 9 illustrates one embodiment of the manufacturing process for producing surface 20. In this embodiment, the optical microstructure is wrapped about a cylinder 38, which can be about 5 centimeters in diameter. A metal source 40, such as aluminum, is positioned about 19 centimeters inches from the center of cylinder 38. A baffle or mask 41, disposed between the cylinder 38 and the metal source 40, prevents the metal from covering the entire microstructure. The baffle or mask 41 can be sized sufficiently to block the surface of the microstructure from the metal source 40 except in area "A". This arrangement is positioned within a bell jar vacuum. Angle α in this embodiment is about 7.5 degrees. In one embodiment, the microstructure included a moth-eye structure and it was found that in area "A", the moth-eye structure had the optimal amount of metalization on one side of the peaks 18. The cylinder 38 can be rotated such that the entire moth-eye structure is coated at area "A". In alternative embodiments, as illustrated in FIGS. 10 and 11, both sides of the peaks 18 are coated by setting the coating features to allow the coating to impact the surface when coming from different angles. The position of the metal source 40 and masks can be adjusted to created a desired coated area.

In alternative embodiments, the entire microstructure is metalized for example, with aluminum. More metal is deposited on the peaks than on the walls and valleys because of the various directions the metal impacts the microstructure. The microstructure is then etched with a caustic for a defined period of time to remove the thinner metal layer while leaving the metal on the peaks.

Figure 12:
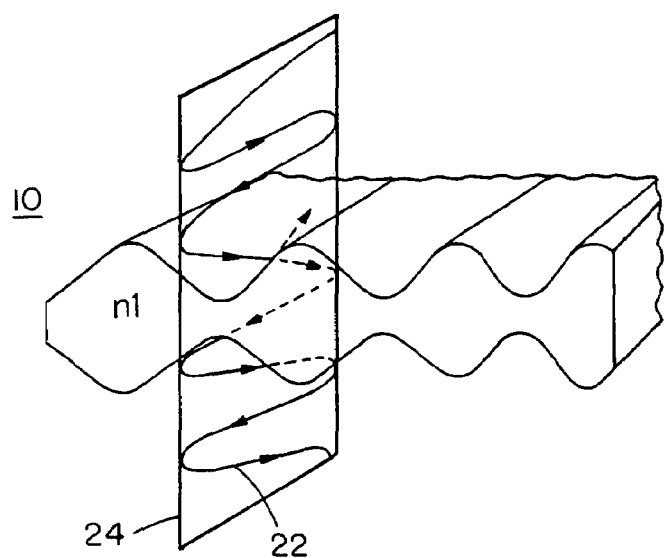
FIG. 12 is a partial isometric view of a polarizing film utilizing multiple moth-eye structures in accordance with one embodiment of the present invention.

FIG. 12 illustrates another embodiment of a polarizing film 10. It is known that essentially 0% of the light component which is perpendicular to the linear moth-eye rows is reflected at each moth-eye boundary because the moth-eye acts as an anti-reflection reflection surface in this direction. It is further known that approximately 4% of the light component which is parallel to the linear moth-eye, for example, light ray 22 in plane 24, is reflected at each linear moth-eye boundary because the light wave sees a flat surface rather than a moth-eye surface. Thus, with enough moth-eye layers, substantially all of the light component which is parallel to the linear moth-eye structures is reflected and only the light perpendicular to the moth-eye structures are transmitted therethrough to create a linear reflecting polarizer. Other structures can be stacked on one another to create a polarizer, such as a linear prism structure (FIG. 6) or a modified type moth-eye structure (FIG. 7).

Figure 13:
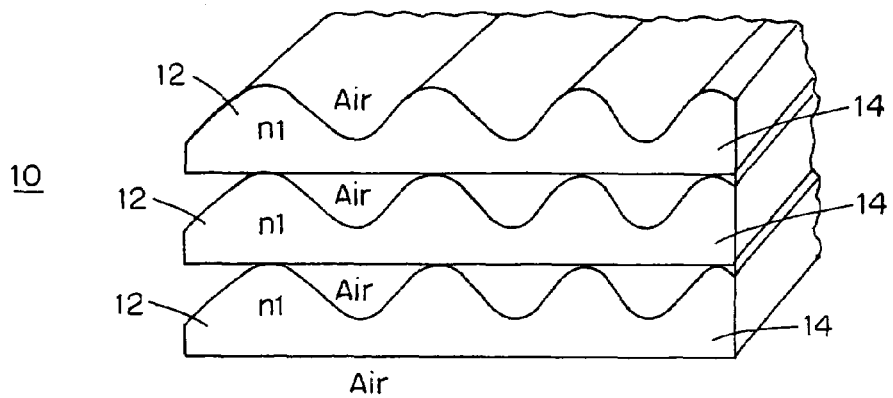
FIG. 13 is a partial isometric view of a polarizing film utilizing multiple moth-eye structures in accordance with another embodiment of the present invention.

FIG. 13 illustrates multiple moth-eye structures 12 stacked on one another to form a polarizing film 10. In one embodiment, approximately 40 layers or 80 surfaces can be used to achieve effective polarization of the light, which polarizes approximately 96% of the light passing through the film.

Figure 14:
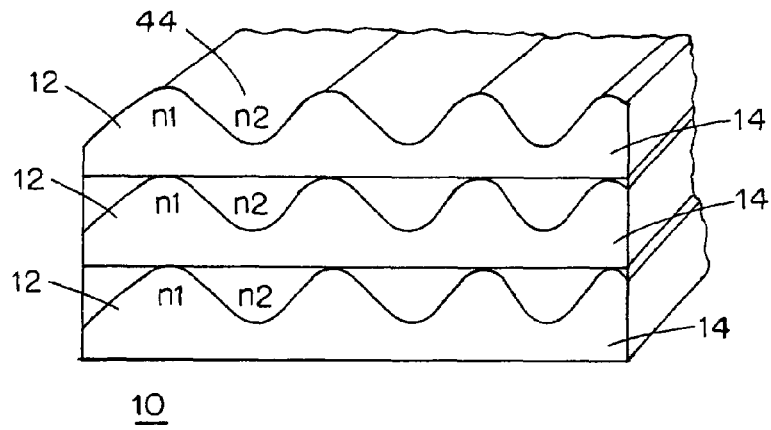
FIG. 14 is a partial isometric view of a polarizing film utilizing multiple moth-eye structures in accordance with yet another embodiment of the present invention.

FIG. 14 illustrates another embodiment of a stack moth-eye structure 12 which forms a polarizing film 10. In this embodiment, a fill layer 44 is provided between each moth-eye structure 12 to vary the reflection properties by changing the refractive index of the moth-eye structure relative to the substrate 14 and fill layer. Fill layer 44 can include low index of refraction materials such as silicone based and fluoropolymer based materials.

For optimal performance, n1 is greater than n2. In one embodiment, n1 is greater than n2 by 0.5 units or more to reduce the number of layers which can be used to achieve effective polarization of the light. The number of layers is reduced because the greater the index of refraction, the more light is reflected at each boundary. In one embodiment, n1 is approximately 1.59 and n2 is approximately 1.42 with a delta of 0.16. In this case, approximately 100 layers or 200 surfaces can be used to achieve effective polarization of the light.

Figure 15:
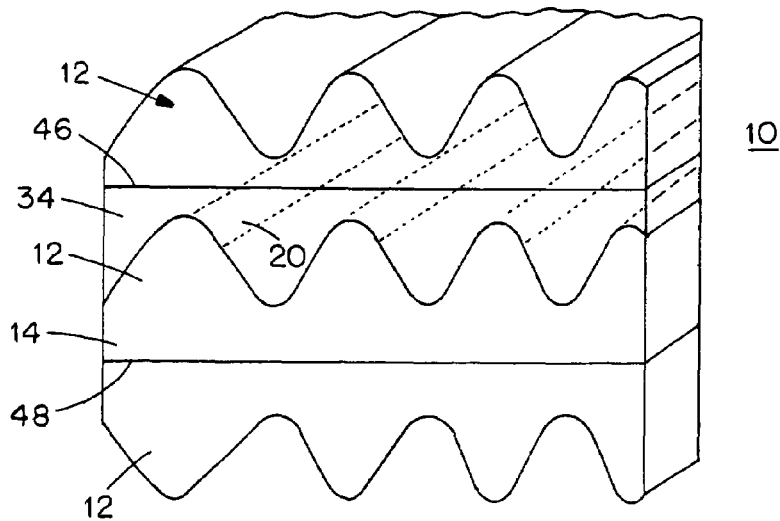
FIG. 15 is a partial isometric view of a polarizing film utilizing multiple moth-eye structures in accordance with another embodiment of the present invention.

FIG. 15 illustrates another embodiment of a polarizing film 10. A coating 34, such as a transparent coating, can be applied over surfaces 20 to protect the same. Moth-eye structures 12 can be added to either surface 46 and 48, or both, to improve the light transmission of the film 10. In the embodiment shown in FIG. 15, a moth-eye structure 12 has been added to both surfaces 46 and 48. The location of the surface 20 can be defined such that it will act as an anti-glare surface by reflecting unwanted light away from a display. This structure further acts as a contrast enhancing film because of the anti-reflection, polarization and dark line pattern created by the surface 20.

Figure 16:
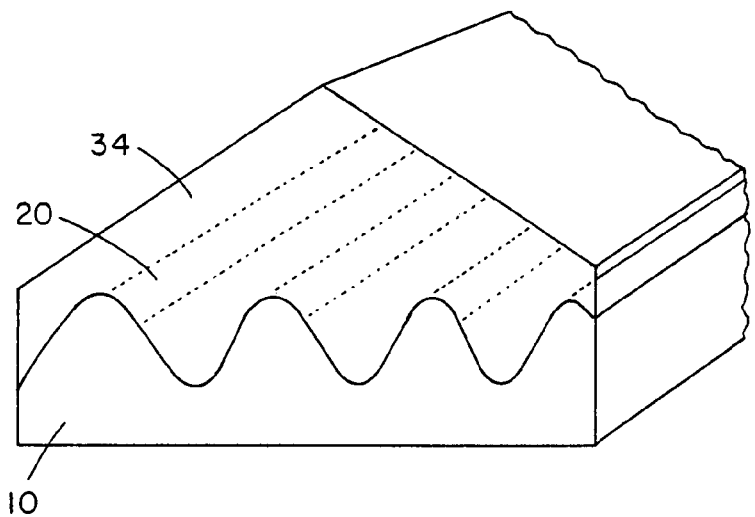
FIG. 16 is a partial isometric view of a linear prism having a polarizing film on one surface.
Figure 17:
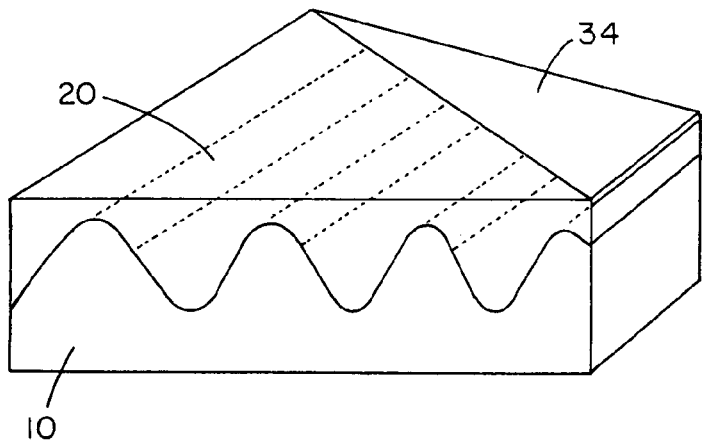
FIG. 17 is an isometric view of a cube-corner prism having a polarizing film on one surface.
Figure 18:
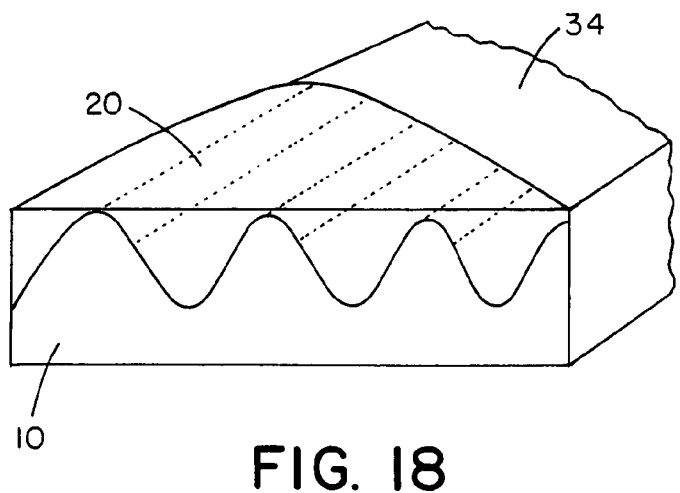
FIG. 18 is a partial isometric view of a lens having a polarizing film on one surface.
Figure 19:
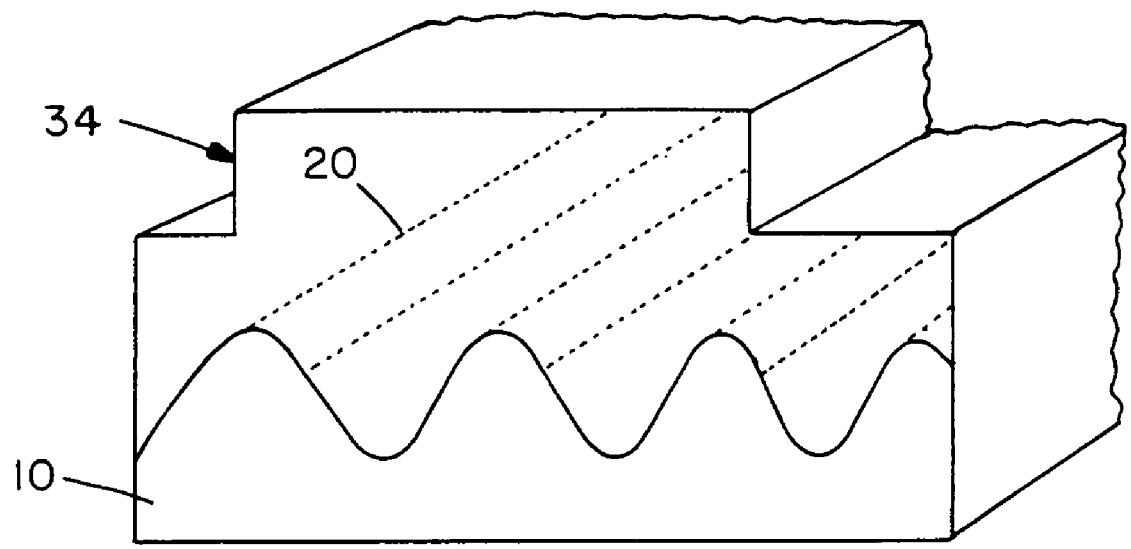
FIG. 19 is a partial isometric view of a surface relief diffuser having a polarizing film on one surface.

FIGS. 16, 17, 18, and 19 illustrate exemplary applications for the polarizing film 10. FIG. 16 illustrates the protective coating 34 formed into a linear prism to form a transparent polarizing linear prism collimating film. In one embodiment, the linear prisms have a height in the range of between about 10 and 200 micrometers and a pitch in the range of between about 20 and 400 micrometers. An example of suitable linear prisms is disclosed in U.S. Pat. No. 4,260,220 issued to Whitehead on Apr. 7, 1981, the teachings of which are incorporated herein by reference. FIG. 17 illustrates the protective coating 34 formed into a cube-corner prism to form a transparent polarizing cube-corner film. In one embodiment, the cube-corner prisms can have a height in the range of between about 20 and 200 micrometers and a pitch in the range of between about 50 and 500 micrometers. Examples of suitable cube-corner prisms are disclosed in U.S. Pat. No. 3,684,348, issued to Rowland on Aug. 15, 1972, the teachings of which are incorporated herein by reference. FIG. 18 illustrates the protective coating 34 formed into a lens. Many types of polarizing lenses can be formed including lenticulars, linear bar lenses, single lenses, lens arrays, etc. FIG. 19 illustrates the protective coating 34 formed into the shape of a surface relief diffuser for use in applications such as front and rear projection screens.

Figure 21:
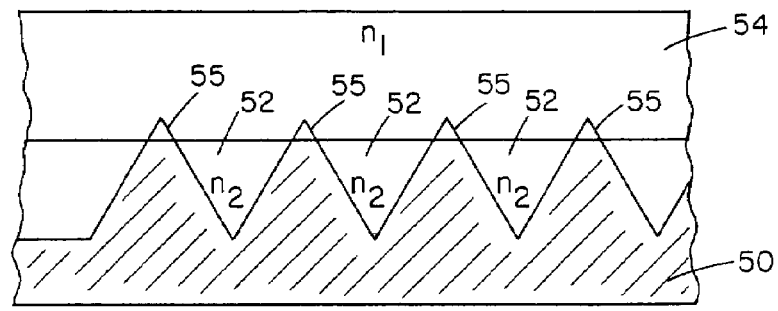
FIG. 21 is a side view of the tool of FIG. 20 forming the linear prisms.

FIGS. 20 and 21 illustrate a method of manufacturing subwavelength linear prisms having a different index of refraction than the supporting substrate. FIG. 20 is a side view of a drum that is ruled to form a tool 50 having linear prisms at approximately the pitch of a moth-eye structure. In one embodiment, this pitch is about 250 nm. Resin 52 is cast onto a relatively soft substrate 54, such as urethane or vinyl, which allows the linear prism tips 55 to penetrate the substrate leaving resin in subwavelength size (FIG. 21). In this embodiment, the resin 52 has an index of refraction different than substrate 54.

Figure 22:
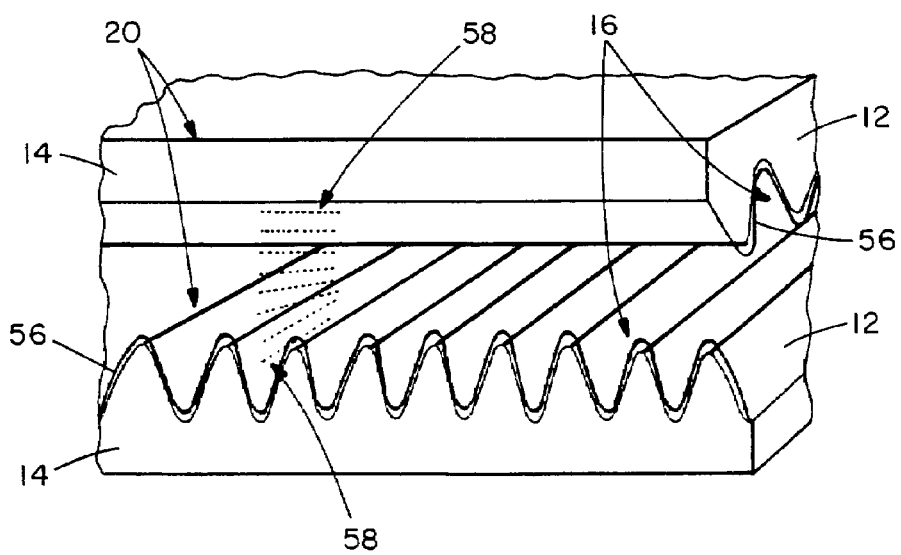
FIG. 22 is a partial isometric view of a liquid crystal display utilizing a polarizing film in accordance with the present invention.

In any of the disclosed embodiments, if surface 20 is metalized or includes a conductive material, it can be used as a narrow conducting path for use in products such as liquid crystal displays. Thus, the same film 10 can be used to polarize the light and serve as a conducting path. Additionally, the channels, such as the valleys 16 of the moth-eye structures, can act as alignment grooves for the liquid crystal material, as illustrated in the embodiment of FIG. 22.

Generally, in one embodiment, a pair of moth-eye structures 12 having conductive surfaces 20 for polarizing incoming random light are positioned 90 degrees relative to one another. A passivation coating or layer 56, such as an oxide layer, can be formed on the moth-eye structure 12 to protect the structure against contamination and to increase electrical stability. The moth-eye channels or valleys 16 act as alignment grooves for the liquid crystals 58 which turn through 90 degrees with the material directly adjacent the valleys 16 being substantially parallel thereto. As understood in the art, when an electric current is carried, for example, by surfaces 20, the liquid crystals 58 are aligned such that light polarized by a polarizer in a first direction is blocked by the adjacent polarizer, which is 90 degrees offset. With no electric current, the liquid crystals are aligned as illustrated in FIG. 22 such that the light's plane of vibration twists through a right angle so light passes through the adjacent polarizer.

Figure 23:
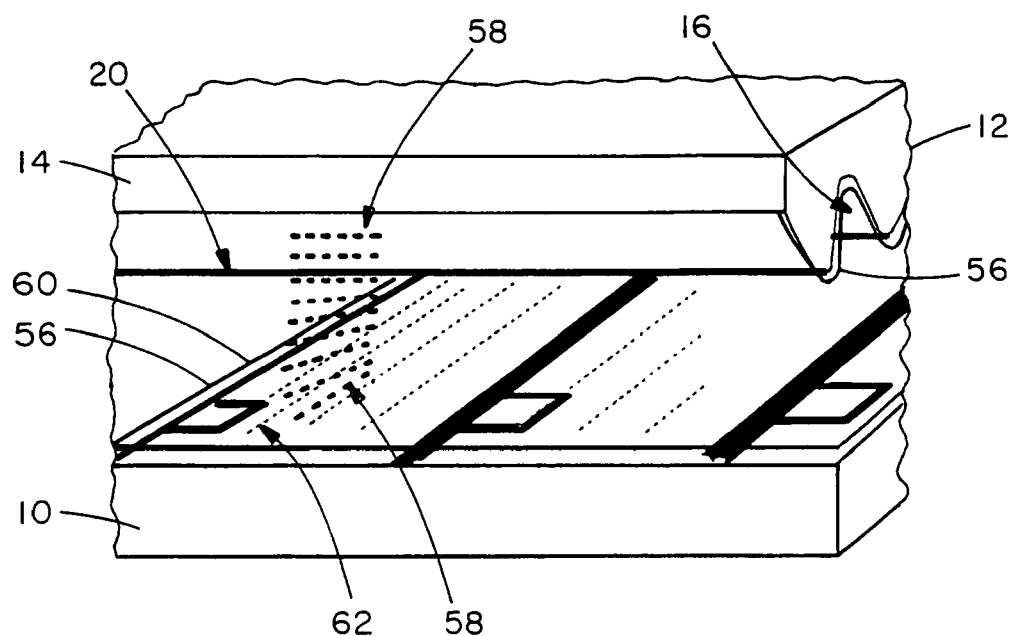
FIG. 23 is a partial isometric view of a liquid crystal display utilizing a polarizing film in accordance with the present invention.

In the embodiment of FIG. 23, layer 60 is made using existing standard technology and includes a passivation coating 56 formed over the entire surface. A plurality of brushed alignment channels 62 are used to align the liquid crystals 58. A polarizer 10, such as a moth-eye structure 12 having surfaces 20, can be placed on the outside surface for polarizing incoming light. The other polarizer (shown on top in FIG. 23) can be similar to the polarizers as shown in FIG. 22. Thus, in accordance with the present invention, the expensive secondary step of brushing alignment channels can be beneficially avoided.

Figure 24:
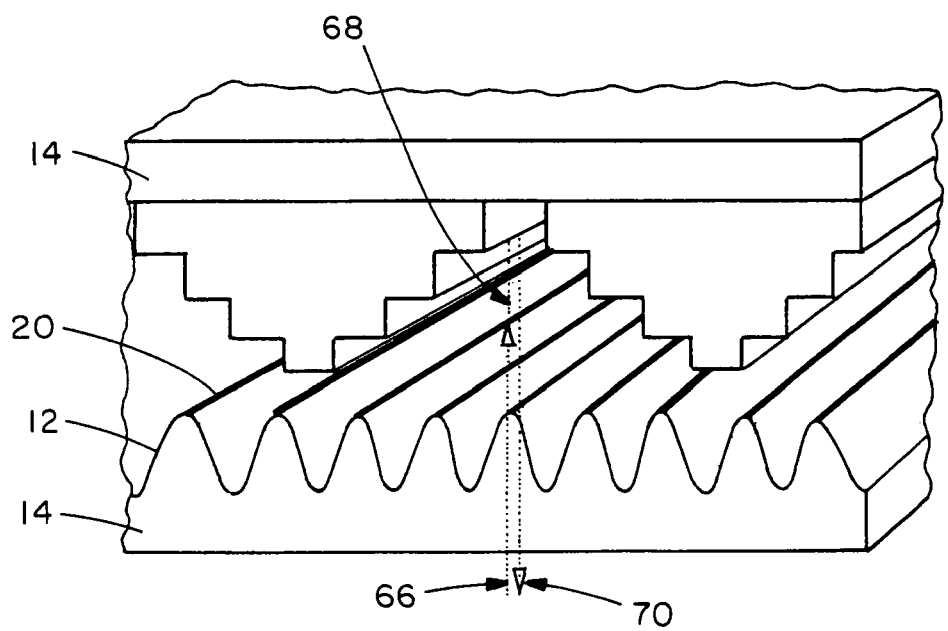
FIG. 24 is a partial isometric view of a color filter utilizing a polarizing film in accordance with the present invention.

FIG. 24 illustrates a moth-eye 12 polarizer in accordance with the present invention, used in conjunction with a resonance structure 64, such as an Aztec structure developed by Dr. Jim Cowan, to provide a high contrast color filter. Unpolarized light 66 is polarized by the moth-eye structure 12 such that polarized light 68 impinges upon the resonance structure 64. Only light of a predetermined wavelength is reflected by the resonance structure at a given location to produce a high contrast output wavelength 70.

The polarizing film of the present invention can be used in a wide range of applications including sunglasses, LCD displays, windows, and security documents. The polarizing film can be made very thin and light in weight. The thickness of the film can be as small as one wavelength of light. In one embodiment, the thickness of the moth-eye structure carried on a substrate is in the order of 12.7 micrometers or greater (0.0005 inches or greater).

Also, the materials used can be very temperature stable relative to the material used to make traditional polarizing films. Traditional polarizers are made by aligning microscopic crystals in a suitable base. A traditional polarizer typically performs in a range of 25 to 40% efficiency because of absorption losses. The polarizer of the present invention achieves a near 50% efficiency with the only losses occurring from absorption within the clear polymers used to construct the polarizer and imperfections in the reflective coating process.

Also, because the approximately 50% or less of light that is reflected from the coated surfaces is not absorbed, it is available to be recycled back through the new polarizer material. Thus, an efficient polarizer is provided in accordance with the present invention.

Figure 25:
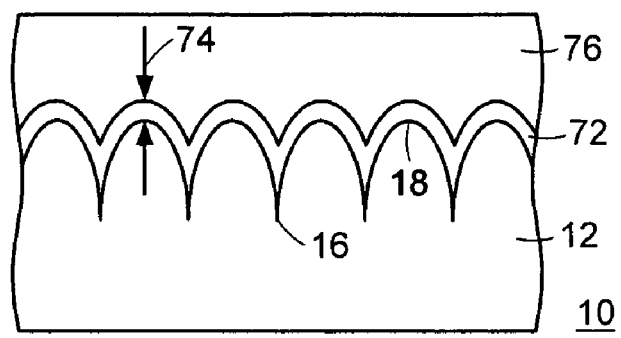
FIG. 25 is a side view of a moth-eye structure having a conductive surface and a conductive coating thereon for forming a polarizing film.
Figure 26:
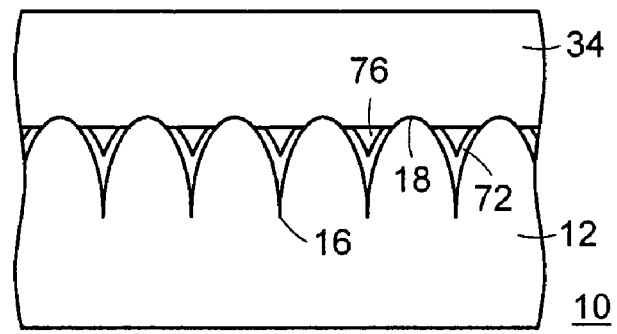
FIG. 26 is a side view of a polarizing film utilizing a moth-eye structure in which a conductive surface and a conductive coating are provided in the valleys of the moth-eye structure.

FIGS. 25 and 26 illustrate an embodiment for forming a reflective or absorptive polarizing film 10. A subwavelength optical microstructure, such as a moth-eye structure or film 12, is cast or otherwise provided. A conductive or metal surface or coating 72, which can have a thickness 74 of about 500 angstroms in a particular embodiment, can be formed, such as by vacuum metallization or other suitable techniques, on the moth-eye film 12. A conductive coating 76 can be electroplated or otherwise formed on the conductive surface 72. The conductive surface 72 can be used to grow the conductive coating 76. The conductive coating 76 and surface 72 can be removed from the moth-eye peaks 18 leaving valleys 16 fully conductive. The conductive coating 76 and surface 72 can be removed from the peaks 18 by caustic chemical etching techniques, mechanical brushing, skiving, or other suitable techniques. A substantially transparent coating 34 can be provided to protect the polarizing film 10.

Figure 27:
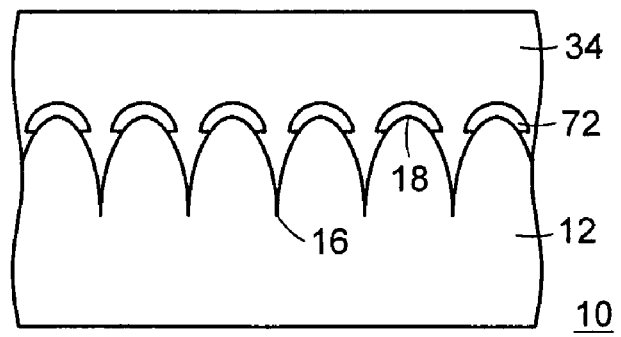
FIG. 27 is a side view of a polarizing film utilizing a moth-eye structure in which a conductive surface is provided on peaks of the moth-eye structure.

In another embodiment of a polarizing film 10 as illustrated in FIG. 27, a soluble coating can be applied to the valleys 16 of the moth-eye film 12 prior to forming the conductive surface 72 on the film. This allows the conductive surface 72 to be rinsed off the valleys 16 leaving the conductive surface on the peaks 18. A substantially transparent coating 34 can be provided on the film 10.

Figure 28:
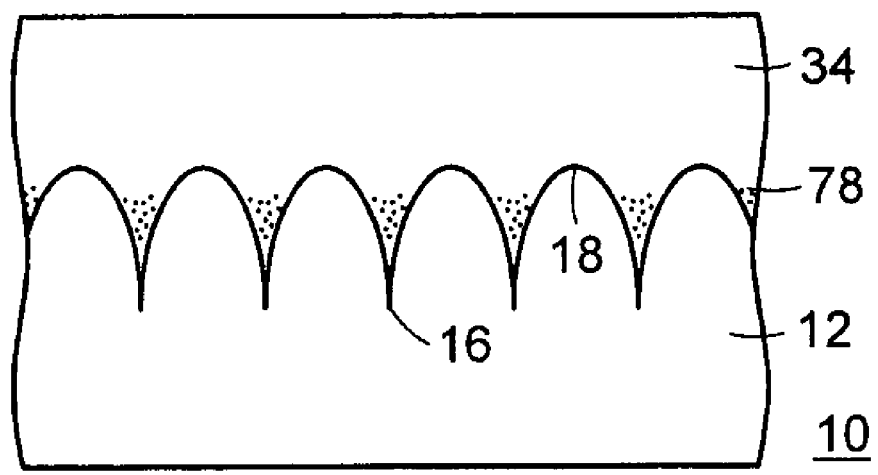
FIG. 28 is a side view of a polarizing film utilizing a moth-eye structure in which conductive particles are provided in the valleys of the moth-eye structure.

In other embodiments of a polarizing film 10, a moth-eye film 12 can be cast or otherwise provided as illustrated in FIG. 28. A plurality of conductive particles 78 can be provided in the moth-eye valleys 16 while leaving the peaks 18 exposed. In one embodiment, the particles 78 can include nano particles. In other embodiments, the particles 78 can include about 0.2 micrometer or smaller size metal particles, such as silver (Ag), aluminum (Al), titanium dioxide ($TiO_2$), or other suitable materials. In a particular embodiment, a magnet can be used to pull the particles 78 into the valleys 16, and excess particles can be removed leaving the peaks 18 exposed. A substantially transparent coating 34 can be provided on the polarizing film 10.

Figure 29:
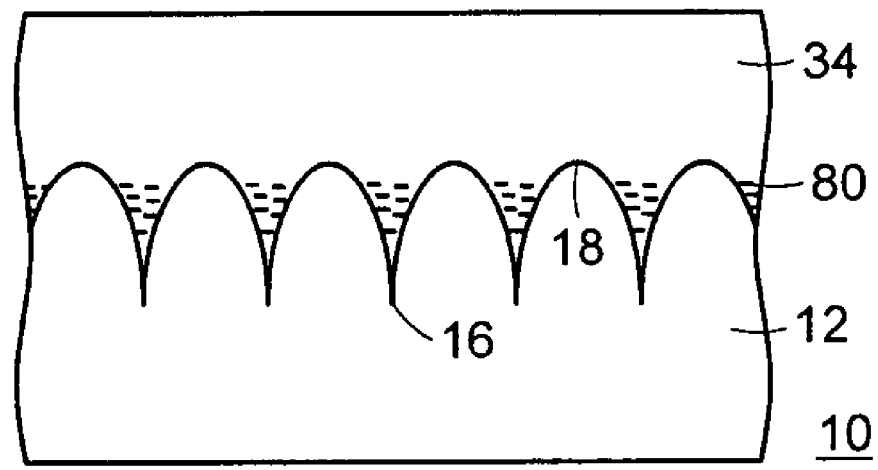
FIG. 29 is a side view of a polarizing film utilizing a moth-eye structure in which conductive filler is provided in the valleys of the moth-eye structure.

In another embodiment of a polarizing film 10 illustrated in FIG. 29, a conductive filler 80, which can include conductive fibers, can be provided in the valleys 16 of a moth-eye film 12. In a particular embodiment, the conductive filler 80 can be brushed into the valleys 16 and excess filler removed so that the peaks 18 are substantially clean. A substantially transparent coating 34 can be provided on the polarizing film 10.

Figure 30:
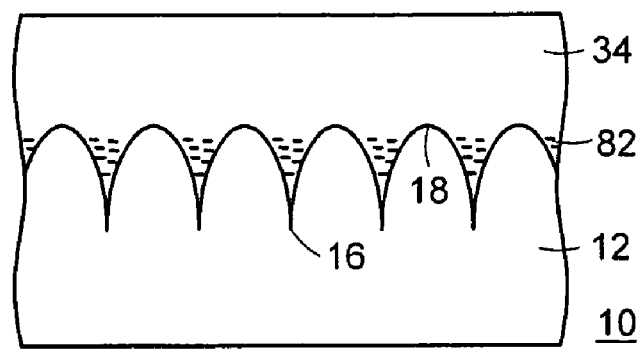
FIG. 30 is a side view of a polarizing film utilizing a moth-eye structure in which an opaque filler is provided in the valleys of the moth-eye structure.

FIG. 30 illustrates another embodiment of a polarizing film 10 in which an opaque filler 82, which can include opaque fibers, is provided in the valleys 16 of a moth-eye film 12. In a particular embodiment, the filler 82 can be brushed or coated into the valleys 16 and excess filler removed so that the moth-eye peaks 18 are clean. A substantially transparent coating 34 can be provided on the polarizing film 10.

Figure 31:
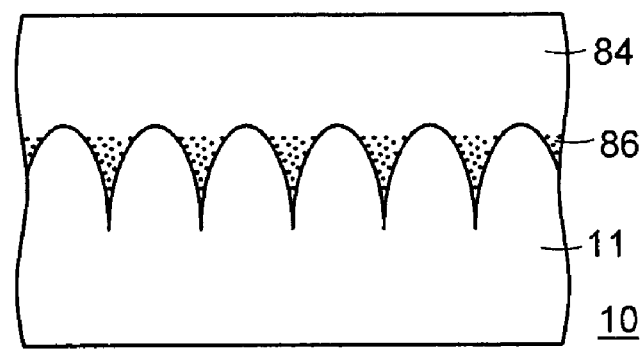
FIG. 31 is a side view of a tool used to form a moth-eye structure in which particles are disposed in a resin used to form the moth-eye structure.
Figure 32:
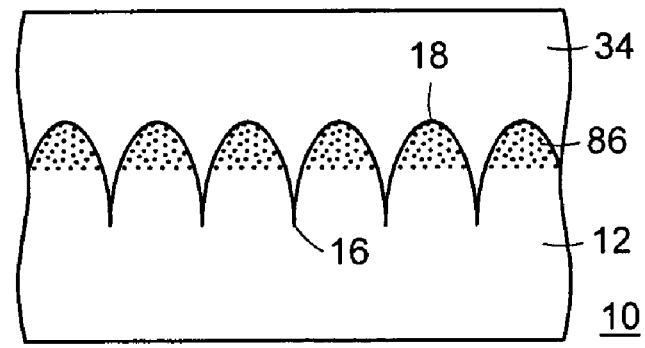
FIG. 32 is a side view of a moth-eye structure formed by the tool illustrated in FIG. 31 in which particles are disposed in the peaks of the moth-eye structure.

In another embodiment, a resin 84, which can be conductive, is cast on a linear moth-eye mold 11, as illustrated in FIG. 31, to form moth-eye film 12. A plurality of particles 86 can be provided in resin 84 that sink to the bottom of the mold 11, which forms the peaks 18 of the resulting moth-eye film 12. In a particular embodiment, the particles 86 can be conductive. When the moth-eye film 12 is cured and removed, as illustrated in FIG. 32, the particles 86 are thus formed in at least some of the peaks 18. A substantially transparent coating 34 can be provided on the polarizing film 10.

While this invention has been particularly shown and described with references to various embodiments thereof, it will be understood by those skilled in the art that various changes in form and details may be made therein without departing from the scope of the invention encompassed by the appended claims.

What is claimed is:

1. An optical polarizer film comprising a substrate having a subwavelength moth-eye structure including peaks and valleys, an intermittent surface covering at least a portion of the structure, and a conductive coating disposed on the intermittent surface in at least some of the valleys and providing polarization.

2. The optical polarizer film of claim 1, further comprising a substantially transparent coating disposed on the polarizer film.

* * * * *